United States Patent
Dupont Skovsby

(10) Patent No.: US 9,612,007 B2
(45) Date of Patent: Apr. 4, 2017

(54) LIGHT SYSTEM FOR BUILDING STRUCTURES

(75) Inventor: Christoffer Dupont Skovsby, Koebenhavn V (DK)

(73) Assignee: DUPONT LIGHTSTONE, Odense M (DK)

( * ) Notice: Subject to any disclaimer, the term of this patent is extended or adjusted under 35 U.S.C. 154(b) by 0 days.

(21) Appl. No.: 14/000,034

(22) PCT Filed: Jan. 26, 2012

(86) PCT No.: PCT/DK2012/050032
§ 371 (c)(1),
(2), (4) Date: Jun. 2, 2014

(87) PCT Pub. No.: WO2012/110039
PCT Pub. Date: Aug. 23, 2012

(65) Prior Publication Data
US 2014/0333514 A1    Nov. 13, 2014

(30) Foreign Application Priority Data
Feb. 16, 2011   (DK) ................. 2011 00108

(51) Int. Cl.
*F21V 33/00*  (2006.01)
*G02B 6/08*  (2006.01)
*G09G 3/32*  (2016.01)

(52) U.S. Cl.
CPC .............. *F21V 33/006* (2013.01); *G02B 6/08* (2013.01); *G09G 3/32* (2013.01); *Y10T 29/49002* (2015.01)

(58) Field of Classification Search
CPC ..... G02B 6/0008; E04C 1/397; F21V 33/006; G09F 9/305; G09G 3/32
USPC .... 345/76–83, 204; 362/551, 555, 147, 576; 52/220.1; 29/592.1
See application file for complete search history.

(56) References Cited

U.S. PATENT DOCUMENTS

| | | | | |
|---|---|---|---|---|
| 3,829,857 A | * | 8/1974 | Allan et al. .............. | 340/815.43 |
| 6,632,008 B2 | * | 10/2003 | Kalkbrenner ........ | G02B 6/0006 362/551 |
| 2004/0218864 A1 | * | 11/2004 | Frankiewicz .......... | G02B 6/241 385/38 |
| 2006/0236624 A1 | * | 10/2006 | Blair ........................... | 52/220.1 |
| 2009/0109700 A1 | * | 4/2009 | Yi et al. ....................... | 362/581 |

FOREIGN PATENT DOCUMENTS

| | | |
|---|---|---|
| WO | WO 03/083810 | 10/2003 |
| WO | WO 2008/031610 | 3/2008 |

OTHER PUBLICATIONS

International Search Report from International Application No. PCT/DK2012/050032 mailed Mar. 20, 2012.

* cited by examiner

*Primary Examiner* — Stephen Sherman
(74) *Attorney, Agent, or Firm* — Merchant & Gould P.C.

(57) ABSTRACT

There is provided embedded light guiding parts that allow for light, signals or live images to appear on its surface. Specifically there is provided a light system having an array of rods made in a hard transparent or translucent polymer material embedded in a building material. The tapered rods are held together by a back-bone that connects the bases of the tapered rods to achieve an evenly distributed array of tapered rods, preferably having the same orientation, wherein the rods are adapted to receive a light input at the base ends and to transmit the light output at the front ends of the rods.

15 Claims, 2 Drawing Sheets

LIGHT SYSTEM FOR BUILDING STRUCTURES

This application is a National Stage Application of PCT/DK2012/050032, filed 26 Jan. 2012, which claims benefit of Serial No. PA 2011 00108, filed 16 Feb. 2011 in Denmark and which applications are incorporated herein by reference. To the extent appropriate, a claim of priority is made to each of the above disclosed applications.

FIELD OF THE INVENTION

The present invention relates generally to embedded light guiding parts that allow for light, signals or live images to appear on its surface. Specifically the present invention relates to a transparent array of rods, especially tapered rods, made in a hard transparent or translucent polymer material, which is embedded in a building material.

BACKGROUND OF THE INVENTION

It is very often desired to place displays, such as advertisement, news, TV, video displays on building surfaces such that the display could be seen by many people. Such displays are typically constructed as a large electronic TV screen comprising a number of light emitting pixels, such as LCD or LED screens, or constructed by projecting the image onto the surface of the building. The known displays are therefore placed directly on the building surface and when used outside sensitive to the weather conditions, because their electronic circuits for instance can be damaged by rain, snow or wind and further dust and sand could also damage the displays. It is thus very important to protect these displays against the weather conditions and dust. Another issue is the fact that it is very difficult to integrate the known kind of displays with the building structure in a discreet way such that the display and building structure would appear as one unit. LED screens are today build into walls but are not considered as a natural part of the building when turned on and not even when they are turned off. In some applications it is further desired to integrate/place large displays on surfaces such as floors, pavements, roads and other surfaces in floor/street level but this is not possible with the existing technologies due to the fact that the existing displays easily could be damaged when positioned in these kinds of surfaces One attempt to provide illuminating surfaces relies on wiring that must be embedded into a surface topping, such as asphalt or concrete, as the topping is applied. Cavities must be cut into the surface topping so that the wiring can be connected to a light producing assemblage that must be fitted into each cavity. This type of system use a soft, plastic-like material placed over the light elements through which the light can emanate, but this approach suffers from the same limitations of poor durability.

All of the present known attempts to provide for a self-illuminating fabricated solid present problems that include solids that require chambers, grooves, channels, pockets or panels of significant size for housing a light bulb or other light source from which light is emitted through a soft material located on the top surface of the solid. Additionally, none of these devices provide for an illuminating fabricated solid object, such as a paving block or stepping stone that has the strength, versatility and functionality of a concrete block or stepping stone, that provides for a lighted surface that includes various colors, patterns, or designs of light which may cover either part or the entire surface of the block or stone, where the light source means may be directly connected to the solid, or, alternatively, where the light source may be indirectly connected to the solid, by way of a fiber optic cable, for example, to provide for a plurality of solid objects to receive light from just one or a few light source means, and where the light source means, the color of the light, and the design that is displayed on a visible surface can be changed or replaced easily and rapidly without having to replace the entire object.

WO 03083810 A1 describes a luminous solidified structure which has a light emitting diode lamp fixed by solidification of cement and silica particles. Meanwhile, the rods are not held together by a backbone that connects the base ends of the rods to achieve an array of rods.

In view of the foregoing, it is desirable to provide a display system integrateable into building structures for displaying images while maintaining the strength and durability expected from comparable non-illuminating building structures, and that can do so at low cost while being attractive in appearance, versatile, functional and durable. It is an object to achieve a simple single unit containing the rods and the building materials—but no electronic parts

SUMMARY OF THE INVENTION

The present invention solves the above mentioned problems associated with prior art solutions by providing a light system comprising:
  an array rods, preferably tapered rods, made in a hard transparent or translucent polymer material, said rods held together by a back-bone that connects the bases of the rods to achieve an array of rods, preferably an array of evenly distributed rods, such as tapered rods, preferably having the same orientation, wherein the rods are adapted to receive a light input at the base ends and to transmit the light output to the opposite ends of the rods; and
  a building material, preferably an opaque building material;
wherein the array of rods is embedded in the building material with the proviso that the base ends and the front ends of the rods are not covered with building material.

Preferably the translucent polymer material is selected from the group consisting of acrylates, methacrylates, polycarbonates, PET, polyesters, polyolefins, nylons, fluoropolymers and combinations thereof and combinations of glasses and plastics.

Concerning the building material this is preferably based on clay or cement, such as concrete.

The light system of the present invention may further comprise one or more light sources, such as LEDs, that provide a light input into one or more bases of the rods.

In another aspect there is provided a method of manufacturing the light system of the present invention. Such a method comprises the steps of:
  positioning said array of rods in a form;
  embedding the rods in said building material by providing the building material at least partly around said rods.

In still another aspect of the present invention there is provided a display system integrateable into building structures for displaying images on one or more surfaces, said display system comprises:
  an array of rods embedded in a building block of a building material, said array of rods made in a hard transparent or translucent polymer material, said rods each having a light receiving base end and a light emitting front end, said rods held together by a backbone that connects the base ends of the rods, wherein the rods are adapted to receive a light input at the base ends of the rods and to transmit the light output to the front ends of the rods; and illuminating means adapted to illuminate at least one image onto the base ends of said rods, whereby said image being transmitted to the front ends of the rods to reproduce the image on the surface of the building block.

The light sources of the present invention can be any known light source means. A preferred light source is a light emitting diode (LED). The light source means can be directly connected to the building block or embedded into the building block. The light source may be powered by traditional AC electrical sources, electrical batteries, or other powering source, such as solar, wind, or chemically or organically derived energy. If an LED light source is employed, the system requires only low power and is economical to run and energy efficient.

BRIEF DESCRIPTION OF THE DRAWINGS

In the following, preferred embodiments of the invention will be described referring to the figures, where.

DETAILED DESCRIPTION OF THE INVENTION

Figure 1:
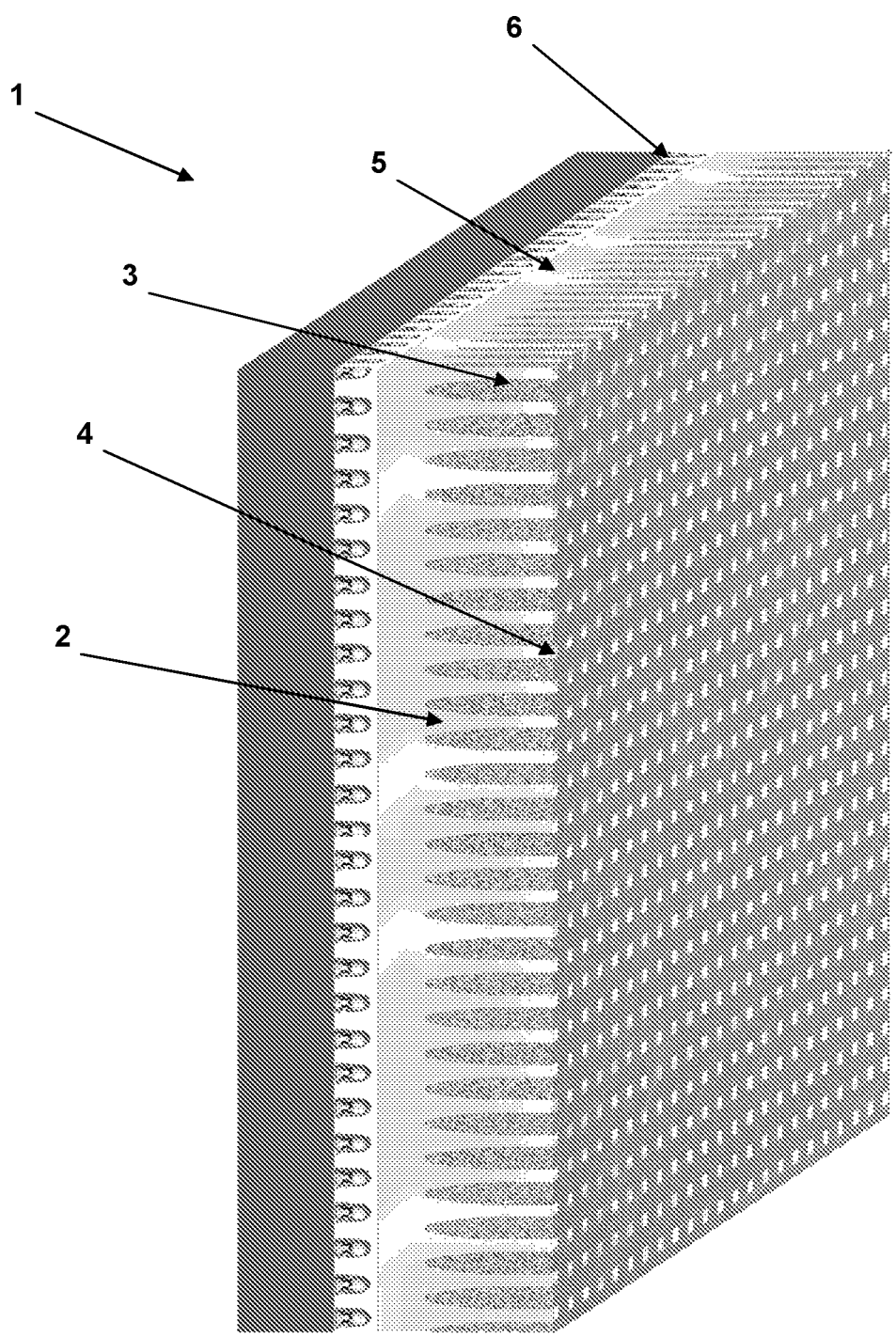
FIG. 1 illustrates a perspective view of a display system (or building block) according to the present invention.

The following description of the preferred embodiments of the invention is not intended to limit the invention to these preferred embodiments, but rather to enable any person skilled in the art to make and use this invention.

The lighting system of the present invention may be used as a sign for pedestrians, vehicles, or bicycles in concrete barriers or abutments, may be used as a display in or on building walls, floors, or ceilings, or may be used in any other suitable environment.

Though rods of limited opacity may be employed in certain instances, typically a preferred rod will be made of any transparent or otherwise translucent material. Preferably, the material has percentage transmission of at least about 50%; more preferably at least about 75%; and most preferably at least about 90%. Preferably, the material is at least partially amorphous or more preferably is substantially entirely amorphous glass or a plastic such as acrylates, methacrylates, polycarbonates, PET, polyesters, polyolefins, nylons, fluoropolymers and combinations thereof and combinations of glasses and plastics. The material may be flexible but is preferably rigid.

In addition, the rod material may colored or doped with a colorant or other component to achieve a desired lighting effect. For example, one or more doping agents may be employed to alter the index of refraction, the strength of the light pipe material or the percentage transmission of the rod. Further, the rod may be doped throughout its length or just a portion or portions thereof or it may be doped throughout its cross-section or just a portion or portions thereof.

The rods may also include a coating or sheath (transparent or opaque) designed to obtain optimal internal reflection in the rods as a result of the difference in refractive indexes of the rod material and the coating or sheath. A coating or sheath may also function as a protection for the rods from physical damage (e.g. abrasion) or from chemical attack (e.g. dissolution or infiltration by an undesired agent or hazard present in the building material or other surrounding environment such as alkaline chemicals or UV-rays, air, oxygen, oil, water, or the like).

The rods may be made according to any conventional technique including casting, molding, drawing, cutting (especially laser cutting), extruding, pultruding, glass rod forming or any suitable film forming technique.

The rods may have any cross sectional form, including circular or polygonal; preferably the rods are tapered. The cross sectional form may vary along the length of the rods; e.g. square at the base end and circular at the light emitting end. Moreover the base ends of the rods may merge into a common fundament/back-bone shared by the rods; e.g. the rods may be glued onto a flat surface (being the fundament/back-bone), such as a disc, or an array of rods may be injection molded as one piece with a commen fundament/backbone.

When referring to the array of rods in accordance with the present invention it means a plurality of rods that are attached to or built into a common base or back-bone. The rods may be distributed evenly as in a coordinate system or they may be distributed to make a specific pattern. Thus, the rods may be distributed in a row (1 dimension), in rows and columns (2 dimensions), or in rows and columns that are not in the same plane (3 dimensions).

When referring to the back-bone in accordance with the present invention it means the common fundament of the rods. It may be made from the same material and in the same process as the rods and preferably the rods and the back-bone are made by injection molding or laser cutting a piece of transparent material into the desired form of the rods and back-bone.

The building material may be any material that is compatible with the rods. The material may be a castable or moldable material, a metal, plastic, ceramic, composite, wood or wood substitute, fiber material for creating a fabric or a laminate (woven or non-woven). The resultant building block may be flexible or rigid, transparent or opaque, or hard or soft to the touch. Preferred materials, such as for use in architectural applications, include concrete, or other materials suitable for producing blocks, bricks or tiles, preferably capable of carrying loads. Other suitable materials include metals, alloys, plastics, silicones, thermoplastics, thermosets, ceramics, composites, laminates, polyesters, epoxies, and combinations thereof. Suitable fiber materials include natural and synthetic fibers for making clothing, fabrics or other woven or non-woven articles. Fiberglass, wood, fiberboard, other composite materials, and the like are also suitable materials.

The surfaces including the ends of the rods may include surface features such as mounds, hills, other promontories, valleys, grooves, trenches or other basins. The surface features may be regular patterns, such as a sine wave, or irregular.

The light source is preferably emitting light within the visible range. The light source preferably includes a control unit to the intensity of the light, the wavelength of the light, or any combination thereof or otherwise. Other methods of manipulating the light, such as turning off the light source, are also suitable.

The light sources may provide visible, IR or other frequencies of electromagnetic energy. The light source may be transient, modulated or stable in its illumination and may utilize a pattern of illumination such as areas of illumination alternating with areas of shadow. The source may be periodic in its illumination or it may be irregular. The light source may be stationary, mobile, at rest or in motion. Plural light sources may also be utilized. The light source can also be capable of multiple colors or multiple light sources of single colors can be clustered together so as to create a module capable of blending the basic colors (RGB) to produce a large number of derivative colors.

In one embodiment, the light system and the light source are packaged together. In one variation, the light source may be located at the base end of the rods. The light source of this variation may be covered and protected within a serviceable weather resistant housing, by grout or another suitable material, or by any other suitable method or device.

The light system of the preferred embodiment may also include a power source, such as a battery, or may include a plug to transmit power from a power grid.

Figure 2:
FIG. 2 shows a cross sectional view of the array of tapered rods.

FIG. 1 illustrates a perspective view of a display system 1 according to the present invention. The display system comprises a building block comprising an array of light transmitting tapered rods 2 embedded into a building material 3, such as concrete, said light transmitting tapered rods comprising an apical end 4, being the light output end and an base end 5 or light input end (not visible in the drawing), where said output end. The display system further comprises illuminating means 6 adapted to illuminate at least one image onto the outer surface of the building block in the form of a pixel pattern, wherein each pixel corresponds to each apical end of the tapered rods. The illumination means is in the illustrated display system embodied as an array of LEDs, where the image formed by the LEDs is projected onto the base ends of the tapered rods an transmitted to the surface of the building block. Each tapered rod corresponds to a pixel and the image would thus be shown at the display pixel pattern of the building block. For ease of understanding there is shown a cross sectional view of the array of tapered rods in FIG. 2.

The invention claimed is:

1. A light system for building structures comprising:
   (a) an array of tapered rods made in a hard transparent or translucent polymer material, said tapered rods each having a light receiving base end and a light emitting front end, said tapered rods held together by a backbone that connects the base ends of the tapered rods to achieve an array of tapered rods, wherein the tapered rods are adapted to receive a light input at the base ends and to transmit the light output to the front ends of the tapered rods; and
   (b) a building material;
wherein the array of tapered rods is embedded in the building material with the proviso that the base ends and the front ends of the tapered rods are not covered with building material, wherein the base ends of the tapered rods merge onto the backbone as a common fundament shared by the tapered rods, wherein the array of tapered rods is injection molded as one piece with the common backbone, and wherein the common fundament shared by the tapered rods has a flat surface forming the light receiving base ends of the tapered rods.

2. The light system of claim 1, wherein the translucent polymer material is selected from the group consisting of acrylates, methacrylates, polycarbonates, PET, polyesters, polyolefins, nylons, fluoropolymers and combinations thereof and combinations of glasses and plastics.

3. The light system of claim 1, wherein the building material is based on clay or cement.

4. The light system of claim 3, wherein the building material is concrete.

5. The light system of claim 1 further comprising one or more light sources that provides a light input into one or more base ends of the tapered rods.

6. The light system of claim 5, wherein the one or more light sources include a light-emitting diode and a second light-emitting diode that cooperatively provide a light input of at least two colors and at least one derivative color.

7. The light system of claim 5, wherein the one or more light sources include a light-emitting diode that provides a light input of at least one color.

8. The light system of claim 5, wherein the light sources are located adjacent to the backbone and the light input is transmitted to the base ends of the tapered rods with a fiber optic cable.

9. The light system of claim 5, wherein the front ends of the tapered rods are configured to produce a light pattern based on the light input transmitted to the base ends of the tapered rods.

10. The light system of claim 5, wherein the light sources are LEDs arranged in an array and aligned with the base ends of the tapered rods.

11. The light system of claim 1, wherein the tapered rods are solid or hollow.

12. A method of manufacturing a light system according claim 1, said method comprising the steps of:
   (a) positioning said array of tapered rods in a form;
   (b) embedding the tapered rods in said building material by providing the building material at least partly around said tapered rods.

13. A display system integrateable into building structures for displaying images on one or more surfaces, said display system comprises:
   (a) an array of tapered rods embedded in a building block of a building material, said array of tapered rods made in a hard transparent or translucent polymer material, said tapered rods each having a light receiving base end and a light emitting front end, said tapered rods held together by a backbone that connects the base ends of the tapered rods, wherein the tapered rods are adapted to receive a light input at the base ends of the tapered rods and to transmit the light output to the front ends of the tapered rods, wherein the base ends of the tapered rods merge into the backbone as a common fundament shared by the tapered rods, and wherein the array of tapered rods is injection molded as one piece with the common backbone; and
   (b) illuminating means adapted to illuminate at least one image onto the base ends of said tapered rods, whereby said image being transmitted to the front ends of the tapered rods to reproduce the image on the surface of the building block; and
   (c) the common fundament shared by the tapered rods has a flat surface forming the light receiving base ends of the tapered rods.

14. The display system of claim 13, wherein the illuminating means is an array of light sources that illuminates a corresponding array of tapered rods.

15. The display system of claim 14, wherein the light sources are LEDs.

* * * * *